May 27, 1969
A. ACKERMAN ET AL
3,446,981
PHOTOELECTRIC SYSTEM FOR DETECTING METER POINTER POSITION
Filed March 21, 1966
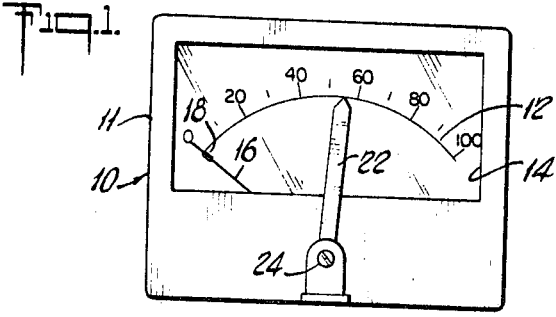
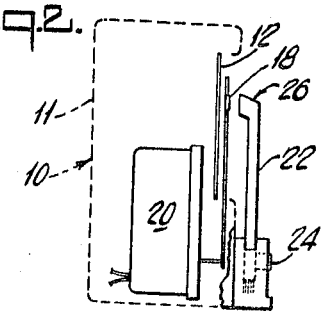
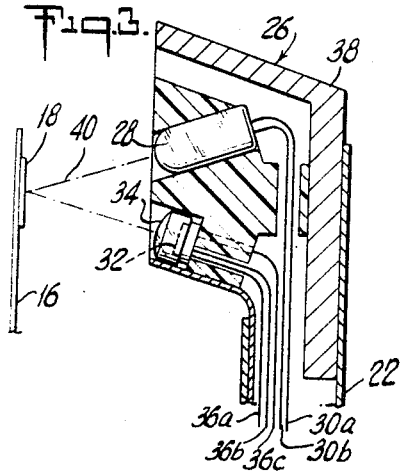
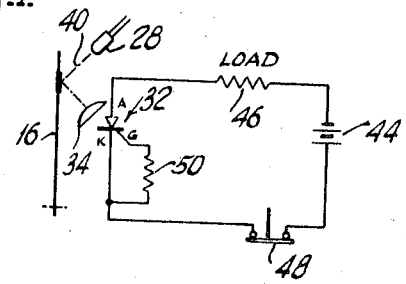
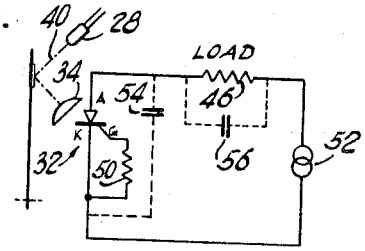
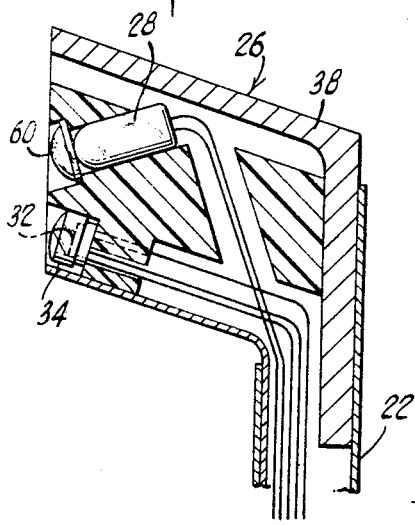
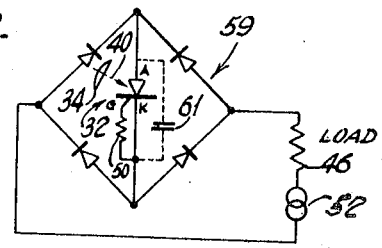
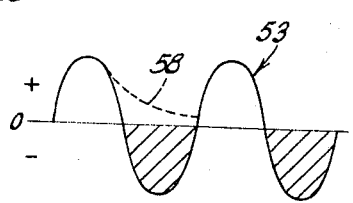
INVENTORS
ABRAM ACKERMAN
BY KURT H. SCHNEIDER
Hopgood & Calimafde
ATTORNEYS

United States Patent Office 3,446,981
Patented May 27, 1969

3,446,981
PHOTOELECTRIC SYSTEM FOR DETECTING METER POINTER POSITION
Abram Ackerman, New Hyde Park, and Kurt H. Schneider, Maspeth, N.Y., assignors to A & M Instrument, Inc., Great Neck, N.Y., a corporation of New York
Filed Mar. 21, 1966, Ser. No. 535,934
Int. Cl. G01d 5/34
U.S. Cl. 250—231
1 Claim

ABSTRACT OF THE DISCLOSURE

A device is described for detacting a selected position of the pointer of an electric meter wherein a pointer is mounted rotatably about an axis at a first pivot, and an indicator which is mounted at a pivot coaxial with the pointer pivot is provided, having at one end thereof a hood which encloses a source of light and a light-sensitive silicon-controlled rectifier. A reflecting surface is provide on the pointer which optically interconnects the light source to the light-sensitive rectifier when the pointer reaches an angular position corresponding to the angular position of the indicator. The rectifier is incorporated in a circuit which provides, across a resistive load, a voltage representative of the conduction of the silicon-controlled rectifier in response to reflected light from the reflection surface on the pointer and incident on the light-sensitive surface of the rectifier. Several circuits are disclosed.

---

This invention relates to light sensitive switches and more particularly to such switches which may be employed with meters and indicators of various types and to circuits using the same.

It is an object of the invention to provide an improved light sensitive switch or relay mechanism.

It is another object of the invention to substantially simplify the circuitry necessary to actuate a load that is to be controlled by the light switch.

Another object of the invention is to provide a light sensitive switch control mechanism in an extremely small package assembly.

A further object is to provide such a miniature package assembly which is easily adapted to many different meter and indicator arrangements as for example, electric meters, pressure indicators, temperature and humidity indicators, dial indicators, and the like.

All of the objects, features and advantages of this invention and the manner of attaining them will become more apparent and the invention itself will be best understood by reference to the following description of an embodiment of the invention taken in conjunction with the accompanying drawing, in which:

FIGURE 1 is a front view of a meter embodying the light switch control arrangement of this invention, FIGURE 2 is a side view of the meter of FIG. 1 showing details of the internal construction thereof and of the light control switch, FIGURE 3 is an enlarged view of a portion of the light switch control arm on the meter of FIGS. 1 and 2, FIGURE 4 is a DC circuit according to the invention which employs the light sensitive switch arrangement of FIG. 3, FIGURE 5 is an AC circuit according to the invention which employs the light sensitive switch arrangement of FIG. 3, FIGURE 6 shows an AC wave form useful in explaining the AC operation according to the invention, FIGURE 7 is a modification of the AC circuit shown in FIG. 5, and FIGURE 8 is an enlarged view similar to FIG. 3 but which employs a collimating lens.

Referring now to FIGS. 1 and 2 there is shown a meter 10 having a casing 11 with a scale 12 visible through a window 14 and a needle or pointer 16 carrying a mirror 18. The pointer 16 is moved across the scale 12 by a suitable motor mechanism 20, in a manner well known to those skilled in the art. A control arm assembly 22 is provided on the front of the meter casing 11 and is mounted in such a manner as to be adjustable to any point on the scale 12 by means of a set-screw 24.

FIGURE 3 shows the upper portion or head 26 of the control arm assembly 22 in enlarged detail. This head portion includes therein a micro-miniature lamp 28 having two wires 30a and 30b for connection to a suitable power source, and a light sensitive silicon controlled rectifier 32 in combination with a convex lens 34 in front of the same. The silicon controlled rectifier 32 has three wires 36a, 36b, and 36c which connect, respectively, to the anode, gate and cathode thereof. The head assembly is further provided with a hood 38 to prevent extraneous light from affecting operation of the device as will appear.

When the device is set for operation the light 28 is maintained lit and produces a light beam 40. When the pointer 16 is at any point on the scale 12 except the set point of the control arm assembly 22, the light beam 40 merely impinges upon the scale. However when the pointer 16 moves to the set point of the control arm assembly 22, either from an upward or a downward direction, the mirror 18 intercepts the light beam 40, causing the light to be reflected into the lens 34 and onto the light sensitive silicon controlled rectifier 32. This causes conduction to take place in the rectifier 32 for controlling a circuit connected thereto, which will now be described.

FIGURE 4 shows the light sensitive silicon controlled rectifier 32 connected to a circuit for controlling the same. This circuit includes a DC source 44, a load represented by the resistor 46 and a resetting or unlatching switch 48, all of these being connected in series with the rectifier 32. The rectifier 32 also includes a biasing resistor 50 to assure proper operation of the rectifier. The circuit of FIG. 4 is, as will be appreciated, a DC circuit. Accordingly when the light from the lamp 28 is reflected onto the rectifier 32, the circuit of FIG. 4 latches, i.e. it stays closed until it is unlatched by depressing the switch 48, thereby opening the circuit and deactivating the load 46. With the circuit of FIG. 4 the load will not be reactivated until light again impinges upon the rectifier 32 to repeat the operation described above. It is a characteristic of the light sensitive silicon controlled rectifier 32 of this invention that it will maintain an "on" condition when used with DC until the potential is removed therefrom, such as, by opening the circuit by depressing the switch 48. Unlatching could also be achieved by connecting the switch 48 across the anode-cathode terminals of the rectifier 32 and closing the contacts thereof.

FIG. 5 shows a circuit similar to that of FIG. 4 but operated by a source of AC potential 52 instead of a DC source as in FIG. 4. When operating with AC, even though light may continuously fall upon the rectifier 32, the same will become non-conductive, resulting in the removal of power from the load 46, during the negative portions of the alternating current source wave 53 shown in FIG. 6. It will thus be seen that the circuit of FIG. 5 embodies an automatic unlatching feature, the unlatching occurring once for each cycle of the AC wave 53 of FIG. 6 during the negative portion thereof. If desired however the circuit of FIG. 5 may be maintained in the latched position whereby operating potential is maintained on the rectifier 32 and the load is kept energized by providing suitable capacitors 54 and 56 which bridge the rectifier 32 and the load 46 respectively. The power provided to the load by the capacitors would then be represented in part by the dashed curve 58 of FIG. 6. In such case, unlatching means such as the switch 48 of FIG. 4 would then of course be desirable for unlatching the circuit.

FIG. 7 shows another circuit for operating the load 46 with a source of AC power which includes a full wave bridge rectifier arrangement in combination with the light sensitive silicon controlled rectifier 32. With the circuit of FIG. 7 the negative portions of the wave of FIG. 6 would of course be converted to positive waves, as is well known, and unlatching would not occur so long as the load 46 included sufficient capacitance or inductance to maintain the rectifier 32 in a conductive state by preventing the positive half-wave portions from reaching the unlatching level.

FIG. 8 shows a view similar to that of FIG. 3. In this figure a collimating lens 60 is provided in front of the lamp 28. This lens is provided to produce a greater intensity of light from a given power input of the lamp 28 so that the lamp can be operated at a lower potential than the rated value. With such a lens a reduction of 20% in the lamp voltage can be easily achieved while maintaining reliable operation.

The latching and unlatching features of this invention can be provided in a single circuit, if desired, by adding to the circuit of FIG. 4 an AC source and a switch the latter being used to selectively connect the AC source into the circuit in place of the DC source 44.

The proper performance of the circuits of this invention and the advantages of the invention depend upon the use of a light sensitive silicon controlled rectifier such as, for example, that known to the trade as a Type 5P15 photocell, manufactured by Solid State Products, Inc. of Salem, Mass. Such device is a PNPN type semiconductor and is characterized by very small size (0.080″ x 0.090″), by rapid "ON" and "OFF" action and by extremely low dissipation of power. The use of this device makes possible the tremendous simplification of the control circuitry of FIGS. 4, 5 and 7 for controlling the load 46 compared with prior arrangements. These prior devices required many additional circuit components, since the photocells used therein could not control a circuit directly but could only actuate the control circuit. Additionally the miniature size of this rectifier 32 makes the control arm assembly now feasible for use in numerous applications where space was previously a limiting factor.

While the foregoing description sets forth the principles of the invention in connection with specific apparatus, it is to be understood that the description is made only by way of example and not as a limitation of the scope of the invention as set forth in the objects thereof and in the accompanying claim.

What is claimed is:

1. A device for detecting a selected position of the pointer of an electric meter comprising an electric meter having a scale with inscriptions and having a pointer mounted rotatably about an axis at a first pivot located below the scale for angular movement about the pivot over said scale with inscriptions, said pointer being provided on a radial location thereof with a light-reflecting surface located in a plane substantially transverse to the axis for reflecting light traveling towards the pointer and the scale, an arm pivotally mounted to said electric meter at a second pivot coaxial with said first pivot with the pointer axially located intermediate the scale and the arm, said arm being provided at one end thereof with a hood having an open end facing the pointer and the inscriptions on the scale, with the hood being generally located at a radial location like said reflecting surface radial location, said hood being inclined at an angle relative to the arm and the axis and terminating in a plane substantially transverse to the axis adjacent the reflecting surface, a source of light mounted within the hood and radially optically enclosed thereby, said source of light being mounted at an angle relative to the arm and the axis to direct light therefrom at said light-reflective surface through said open end, a light concentrating lens adjacent said open end for providing a relatively high density light beam directed at said reflecting surface, whereby said light source may be operated at a low, long life-yielding voltage, a light-sensitive silicon-controlled rectifier having a pair of output terminals and a light-sensitive surface, said rectifier being positioned within said hood with the light-sensitive surface radially optically isolated from said light source and being mounted within the hood to face the reflecting surface at an angle inclined to the arm and the axis in a direction opposite to the angle of the light source mounting to receive the light from the light source as reflected by the reflecting surface, means supplying a source of power to said pair of output terminals and producing a signal indicative of the conduction between the output terminals in response to reflected light from the light source, said means further comprising in a series circuit path the output terminals of said rectifier, a resistive load, a source of direct current, and a normally closed switch to form a latching circuit, said series circuit further comprising a resistance between one of said output terminals and the gate terminal of said rectifier.

References Cited

UNITED STATES PATENTS

| | | | |
|---|---|---|---|
| 2,046,005 | 6/1936 | Sprecker | 250—230 |
| 2,605,963 | 8/1952 | Bohn | 250—231 X |

ROBERT SEGAL, *Primary Examiner.*